US005207497A

United States Patent [19]

Kamishina et al.

[11] Patent Number: 5,207,497

[45] Date of Patent: May 4, 1993

[54] VENTING CONSTRUCTION FOR VEHICLE LIGHT FIXTURE

[75] Inventors: Hiroshi Kamishina; Noritaka Yamaguchi, both of Hadano, Japan

[73] Assignee: Stanley Electric Co., Ltd., Tokyo, Japan

[21] Appl. No.: 871,235

[22] Filed: Apr. 20, 1992

[30] Foreign Application Priority Data

Apr. 24, 1991 [JP] Japan .............................. 3-036900[U]

[51] Int. Cl.[5] .............................................. B60Q 1/00

[52] U.S. Cl. ....................................... 362/61; 362/294

[58] Field of Search ................................ 362/61, 294

[56] References Cited

U.S. PATENT DOCUMENTS 4,405,974 9/1983 Quiogue .............................. 362/294

4,739,458 4/1988 Yamayoshi et al. ................ 362/294

4,755,917 7/1988 Bals et al. ............................ 362/294

4,862,337 8/1989 Ohshio et al. ....................... 362/294

4,937,710 6/1990 Hurley et al. ........................ 362/294

5,010,453 4/1991 Ketterman .......................... 362/294

*Primary Examiner*—Carroll B. Dority

*Attorney, Agent, or Firm*—Frishauf, Holtz, Goodman & Woodward

[57] ABSTRACT

A venting structure of a vehicle lighting fixture having a housing formed with a venting hole, wherein the venting hole is in the form of a venting pipe and extends through the housing, an opening thereof confronting a wall-like structure within the housing with a suitable spacing therebetween. The venting structure is also provided with an enclosure for encircling the venting pipe and the venting hole of the venting pipe, with a suitable spacing therebetween.

4 Claims, 1 Drawing Sheet

VENTING CONSTRUCTION FOR VEHICLE LIGHT FIXTURE

BACKGROUND OF THE INVENTION

1. Field of the Invention

The present invention relates to a vehicle lighting fixture such as a headlamp, and more specifically to a construction of a venting hole provided in a housing of a vehicle lighting fixture.

2. Description of the Prior Art

FIG. 3 shows an example of a conventional venting hole of this kind. In order to provide a permeability within a chamber formed by a housing 11 and a lens 12 of a headlamp 10, a pipe-like venting hole 91 is projected externally of the housing 11. A rubber pipe 92 or the like is connected to the venting hole 91 to prevent entry of water drop.

The headlamp 10 encases therein a structure for example such as a reflecting mirror 13 which constitutes part of the headlamp 10.

However, in the aforementioned conventional venting hole 91, the rubber pipe 92 is connected thereto to thereby surely prevent entry of water drop but dust floating in air is sucked thereinto. With the passage of time in use of the headlamp 10, dust is accumulated on the reflecting mirror 13 and the like. As a result, there gives rise to a problem of insufficient illuminance. This problem should be solved.

SUMMARY OF THE INVENTION

For solving the aforesaid problem, the present invention provides a venting construction of a vehicle lighting fixture having a housing formed with a venting hole, wherein the venting hole is in the form of a pipe and extends through the housing, and wherein an opening thereof confronts a wall-like structure within said housing with a suitable spacing therebetween. The structure is further provided with an enclosure for encircling said pipe-like venting hole with a suitable spacing therebetween. With this arrangement entry of dust can be prevented to solve the problem noted above with respect to the prior art.

DETAILED DESCRIPTION OF THE PREFERRED EMBODIMENTS

Figure 1:
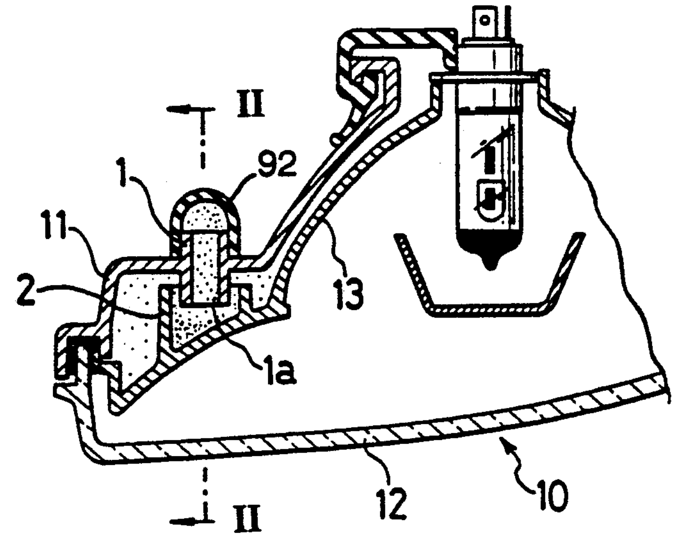
FIG. 1 is a sectional view showing one embodiment of a venting construction for a vehicle lighting fixture according to the present invention.
Figure 2:
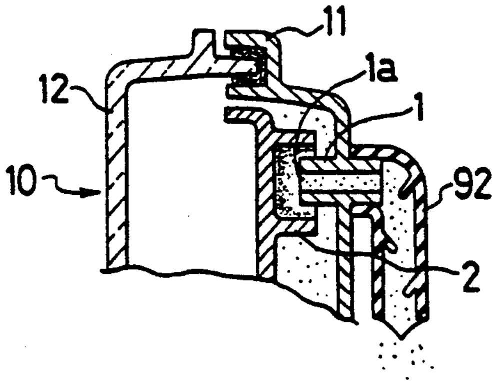
FIG. 2 is a sectional view taken on line II—II of FIG. 1.
Figure 3:
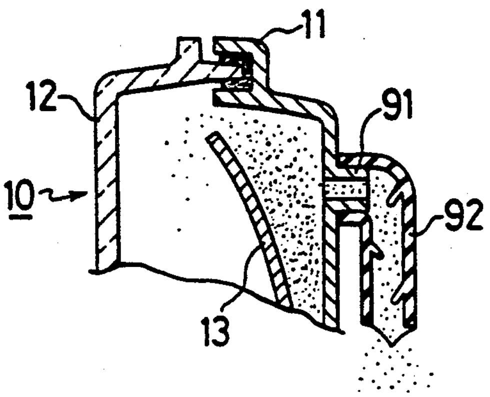
F I G.3 (PRIOR ART)
FIG. 3 is a partial sectional view showing a conventional example of a vehicle lighting fixture.

The present invention will be described in detail on the basis of one embodiment shown in the drawings.

For better understanding, the same parts as those of the prior art are indicated by the same reference numerals, and the duplicate portions are partly omitted from the description.

In FIG. 1, headlamp 10 comprises a chamber including a housing 11 and a lens 12. A venting hole 1 is provided on the side of the housing 11 to provide ventilation for the chamber, similar to the prior art. According to the present invention, the venting hole 1 is in the form of a pipe and extends through the housing 11.

The venting hole 1 according to the present invention will now be further described. The venting hole 1 is formed so as to extend through the housing 11 from the outside toward the interior of the housing 11; that is, so that the venting hole 1 projects both inside and outside of the housing 1. The venting hole 1 has an inner end 1*a* thereof which confronts a wall-like structure for example such as the back of a reflecting mirror 13 provided within the chamber with a suitable spacing therebetween.

At the same time, at the side of the reflecting mirror 13 is provided a ring-like enclosure 2 so as to surround the venting hole 1 with a suitable spacing. Thereby, air attracted through the venting hole 1 impinges upon the rear of the reflecting mirror 13, after which the moving direction thereof is inverted so that air is scattered into the chamber through and between the outer diameter of the venting hole 1 and the enclosure 2.

The function and effect of the venting construction according to the present invention constructed as described above will now be described. With the aforementioned arrangement, air containing dust sucked in from the venting hole 1 impinges upon the rear of the reflecting mirror 13, and temporarily reduces its flow velocity, after which the direction of flow thereof is inverted.

This means that the dust contained in the air is precipitated, or adhered to or separated when it impinges upon the back of the reflecting mirror 13. As a result, dust contained in the flowing air is decreased.

While in the above-description, the structure has been explained by way of the back of the reflecting mirror 13 as an example, it is to be noted that the structure is not limited to the reflecting mirror 13 but others for example such as an escutcheon provided in the peripheral edge of the reflecting mirror can be freely selected.

As described above, according to the present invention, there is provided a venting construction for a vehicle lighting fixture wherein a venting hole is in the form of a pipe and extends through a housing, an opening thereof confronts a wall-like structure within the housing with a suitable spacing therebetween, and the structure is provided with an enclosure for encircling the pipe-like venting hole with a suitable spacing therebetween. With this arrangement, air containing dust sucked into the chamber is once permitted to impinge upon the structure, and the dust is adhered to or precipitated and then separated so that the dust is not scattered into the interior of the chamber, thus reducing the amount of adherence of dust to the reflecting surface of the mirror or the like to thereby prevent the lowering of illuminance and to extend the service life of the vehicle lighting fixture.

What is claimed is:

1. A vehicle lighting fixture having a housing formed with a venting structure including a venting hole, wherein:

said venting hole is in the form of a pipe means which extends through said housing for passing venting air into the interior of said housing;

said pipe means having an opening on an interior portion of said housing that confronts a solid wall-like structure within said housing, said solid wall-like structure facing said opening with a spacing therebetween; and said venting structure further comprising an enclosure extending from said solid wall-like structure in an interior portion of said housing, said enclosure encircling at least a portion of said pipe means with a lateral spacing therebetween, and said enclosure having an opening portion in direct communication with the interior of said housing.

2. The vehicle lighting fixture of claim 1, wherein said solid wall-like structure in said housing comprises a back surface of a reflecting mirror of said vehicle lighting fixture.

3. The vehicle lighting fixture of claim 1, wherein said pipe means includes a pipe and an extension member extending into the interior of said housing.

4. The vehicle lighting fixture of claim 3, wherein said enclosure overlaps said extension member of said pipe means.

* * * * *